(12) United States Patent
Terashima

(10) Patent No.: US 11,378,804 B2
(45) Date of Patent: Jul. 5, 2022

(54) WEARABLE DISPLAY DEVICE

(71) Applicant: SEIKO EPSON CORPORATION, Tokyo (JP)

(72) Inventor: Yasuhiro Terashima, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/886,911

(22) Filed: May 29, 2020

(65) Prior Publication Data

US 2020/0379258 A1 Dec. 3, 2020

(30) Foreign Application Priority Data

May 30, 2019 (JP) .............................. JP2019-101040

(51) Int. Cl.
*G02B 27/01* (2006.01)

(52) U.S. Cl.
CPC .. *G02B 27/0172* (2013.01); *G02B 2027/0118* (2013.01); *G02B 2027/0178* (2013.01)

(58) Field of Classification Search
CPC ........ G02B 27/0172; G02B 2027/0118; G02B 2027/0178
See application file for complete search history.

(56) References Cited

U.S. PATENT DOCUMENTS

| 8,958,158 | B1* | 2/2015 | Raffle | H04W 52/0254 |
| | | | | 359/630 |
| 2013/0113973 | A1* | 5/2013 | Miao | G09G 3/003 |
| | | | | 348/333.01 |
| 2014/0285404 | A1* | 9/2014 | Takano | G06F 3/012 |
| | | | | 345/8 |
| 2016/0187652 | A1* | 6/2016 | Fujimaki | G02B 27/0172 |
| | | | | 345/8 |
| 2017/0235129 | A1* | 8/2017 | Kamakura | G02B 27/0006 |
| | | | | 345/8 |
| 2019/0064525 | A1* | 2/2019 | Mongoven | G02B 27/0172 |
| 2019/0113769 | A1* | 4/2019 | Jouard | G02C 1/08 |

FOREIGN PATENT DOCUMENTS

JP 2001-211403 A 8/2001

\* cited by examiner

*Primary Examiner* — Patrick N Edouard
*Assistant Examiner* — Joseph P Fox
(74) *Attorney, Agent, or Firm* — Oliff PLC

(57) ABSTRACT

A display device configured to emit image light to display an image, and a camera or an illuminance sensor as an external light sensor configured to sense external light are provided, and the camera or the illuminance sensor is positioned to overlap a visually transparent light-guiding unit forming a front-of-eye part of the display device in an emission direction of the image light. Thus, the direction of sensing the external light in the illuminance sensor and the camera is set correspondingly to the direction of the line of sight of the viewer and a state, where these are located in the proximity of the eye of the viewer, is maintained.

12 Claims, 10 Drawing Sheets

WEARABLE DISPLAY DEVICE

The present application is based on, and claims priority from JP Application Serial Number 2019-101040, filed May 30, 2019, the disclosure of which is hereby incorporated by reference herein in its entirety.

BACKGROUND

1. Technical Field

The present disclosure relates to a wearable display device that provides a virtual image and the like to a viewer.

2. Related Art

A configuration is known that uses three or more cameras provided in a head-mounted display device to align positions of captured images (JP-A-2001-211403).

When a device, such as that disclosed in JP-A-2001-211403, in which a camera is disposed on a side (lateral side) or the like of the device is used, positional displacement between the visual recognition direction of the viewer and the camera image cannot be avoided, and consequently it is necessary to align a plurality of images. In this case, for example, when the accuracy of the alignment between the visual recognition direction of the viewer and the camera image is poor, the accuracy of various detections of external light, or the accuracy of the AR function or the like may be reduced. In addition, detection of the surrounding image, detection of the brightness in the direction of the line of sight of the viewer, and the like may not necessarily be accurately achieved. For example, when the user has long hair, the hair may block the front side of the camera lens, and the function may be reduced.

SUMMARY

A wearable display device in one aspect of the present invention includes a display device configured to emit image light to display an image, and an external light sensor configured to sense external light. The external light sensor is located at a position where the external light sensor overlaps a front-of-eye part of the display device in an emission direction of the image light.

DESCRIPTION OF EMBODIMENTS

An exemplary wearable display device according to an embodiment of the present disclosure will be described below in detail with reference to the drawings.

Figure 1:
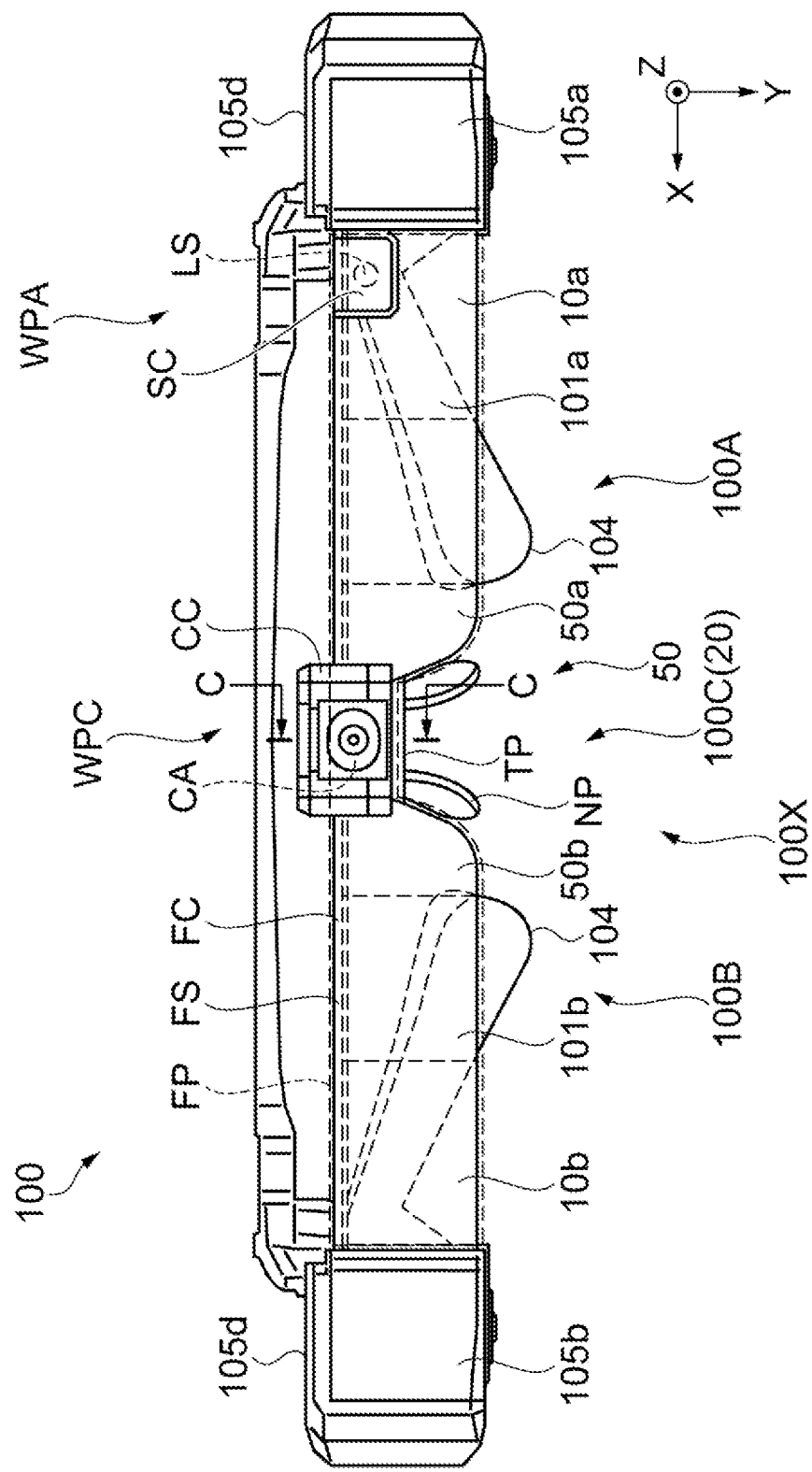
FIG. 1 is a front view for describing an exemplary wearable display device according to an embodiment.

As illustrated in FIG. 1 and the like, a wearable display device 100 of the embodiment is a head-mounted display (HMD) having an eyeglasses-like external appearance. In FIG. 1 and the like, X, Y, and Z are an orthogonal coordinate system. The +X direction corresponds to the lateral direction in which both eyes of a viewer wearing the wearable display device 100 are located, the +Y direction corresponds to a downward direction orthogonal to the lateral direction in which both eyes of the viewer are located, and the +Z direction corresponds to a forward direction or a front direction as viewed from the viewer. In the wearable display device 100, X, Y, and Z are as follows. First, the X axis corresponds to an axis extending along the direction in which two light-guiding members constituting a first display device 100A and a second display device 100B are disposed side by side. The Z-axis corresponds to an axis extending along an emission direction of image light (video light) from the light-guiding member. The Y-axis corresponds to an axis orthogonal to both the X and Z axes.

As illustrated in FIG. 1 and the like, with the wearable display device 100, a viewer or a user wearing the wearable display device 100 can visually recognize a virtual image, and can view an external image in a see-through manner. The wearable display device 100 can be communicatively coupled to an external device such as a smartphone through a cable 109 illustrated in FIG. 2, and can form a virtual image corresponding to an image signal input from the external device, for example. The wearable display device 100 includes the first display device 100A and the second display device 100B. The first display device 100A and the second display device 100B are members that form a virtual image for the left eye and a virtual image for the right eye, respectively. The first display device 100A for the left eye includes a first virtual image forming optical part 101*a* that covers the front side of the eye of the viewer in a visually transparent manner, and a first image forming body part 105*a* that forms image light. The second display device 100B for the right eye includes a second virtual image forming optical part 101*b* that covers the front side of the eye of the viewer in a visually transparent manner, and a second image forming body part 105*b* that forms image light. In other words, images corresponding to the left and right eyes are displayed by the first display device 100A and the second display device 100B. In other words, in the wearable display device 100, a display device 100X that displays an image by emitting image light is constituted with the first display device 100A and the second display device 100B.

Temples 104, which are earpieces extending rearward from the side surface of the head, are attached to rear portions of the first and second image forming body parts 105*a* and 105*b* to maintain the wearing condition of the wearable display device 100 by making contact with the ears, the temples or the like of the viewer. In addition, a nose pad NP that constitutes a support part together with the temples 104 is provided in a recess formed between the first and second virtual image forming optical parts 101a and 101b, and the nose pad NP enables positioning of the virtual image forming optical parts 101a and 101b and the like with respect to the eyes of the viewer. Note that the nose pad NP is assembled to a central member 50 of a visually transparent light-guiding unit 100C that integrates the first display device 100A and the second display device 100B with a fitting TP. The visually transparent light-guiding unit 100C and the central member 50 constituting the same will be described later.

The first and second virtual image forming optical parts 101a and 101b form the visually transparent light-guiding unit 100C as an integrated member coupled together at the center rather than as separate members. The visually transparent light-guiding unit 100C includes a pair of light-guiding members 10a and 10b and the central member 50. The pair of light-guiding members 10a and 10b are a pair of optical members that contribute to virtual image formation while propagating image light therein. The central member 50 includes a pair of light transmission parts 50a and 50b. The light transmission part 50a is joined to the light-guiding member 10a, and the light transmission part 50b is joined to the light-guiding member 10b. The visually transparent light-guiding unit 100C is a composite light-guiding device 20 that provides an image for both eyes to the viewer through light guiding, and is supported by an outer case 105d at both ends, i.e., the tip end sides of the light-guiding members 10a and 10b. In the above-described manner, the visually transparent light-guiding unit 100C forms a part that is transparent while covering the front side of the eyes of the viewer wearing it. In this embodiment, the visually transparent light-guiding unit 100C is referred to as a front-of-eye part FP of the display device 100X. Specifically, the visually transparent light-guiding unit 100C forms a part that is transparent while covering the front side of the eyes of the viewer wearing it as the front-of-eye part FP of the display device 100X, and thus achieves see-through viewing. Note that the image formation and see-through viewing will be described later with reference to FIG. 7.

In addition, in this embodiment, the visually transparent light-guiding unit 100C includes a flat surface FS that extends flush from the first display device 100A to the second display device 100B as the top surface, i.e., the +Y side surface.

A cover member FC is provided as a cover structure at the top surface of the visually transparent light-guiding unit 100C. As described in detail later, in this embodiment, a flexible board, i.e., a flexible printed circuit (FPC) board is employed as a cable for coupling the parts. That is, the cover member FC is an FPC cover. In the space between the cover member FC and the visually transparent light-guiding unit 100C, a thin and narrow space is defined. By employing a flexible board as a cable, it is possible to achieve a configuration in which a cable that electrically couples the first image forming body part 105a and the second image forming body part 105b is laid in the space.

Particularly in this embodiment, in addition to the above, an illuminance sensor LS is provided as a sensor of external light. The illuminance sensor LS is an ambient light sensor (ALS) and is an external light sensor that measures the ambient light intensity in accordance with reactions of the viewer. As such, the illuminance sensor LS is disposed so as to face the +Z direction corresponding to the forward direction or the front direction as viewed from the viewer, and can enable detection of the amount of light entering the eye of the viewer. Specifically, the illuminance sensor LS is located at a position where the illuminance sensor LS overlaps the front-of-eye part FP of the display device 100X in the −Z direction, which is the emission direction of image light. Note that, as illustrated in the drawing, the illuminance sensor LS is attached to an illuminance sensor cover member SC extending from the cover member FC.

Further, in this embodiment, a camera CA is provided at a center portion of the device as a sensor of external light. The camera CA is an image-capturing camera composed of, for example, a solid-state image sensing element such as a CCD and a CMOS, and is an external light sensor that captures (takes) an external image corresponding to a line of sight of the viewer. As illustrated in the drawing, the camera CA is attached to a camera cover member CC extending from the cover member FC. Note that, as with the illuminance sensor LS, the camera CA is also located at a position where the camera CA overlaps the front-of-eye part FP of the display device 100X in the −Z direction, which is the emission direction of image light.

Figure 3:
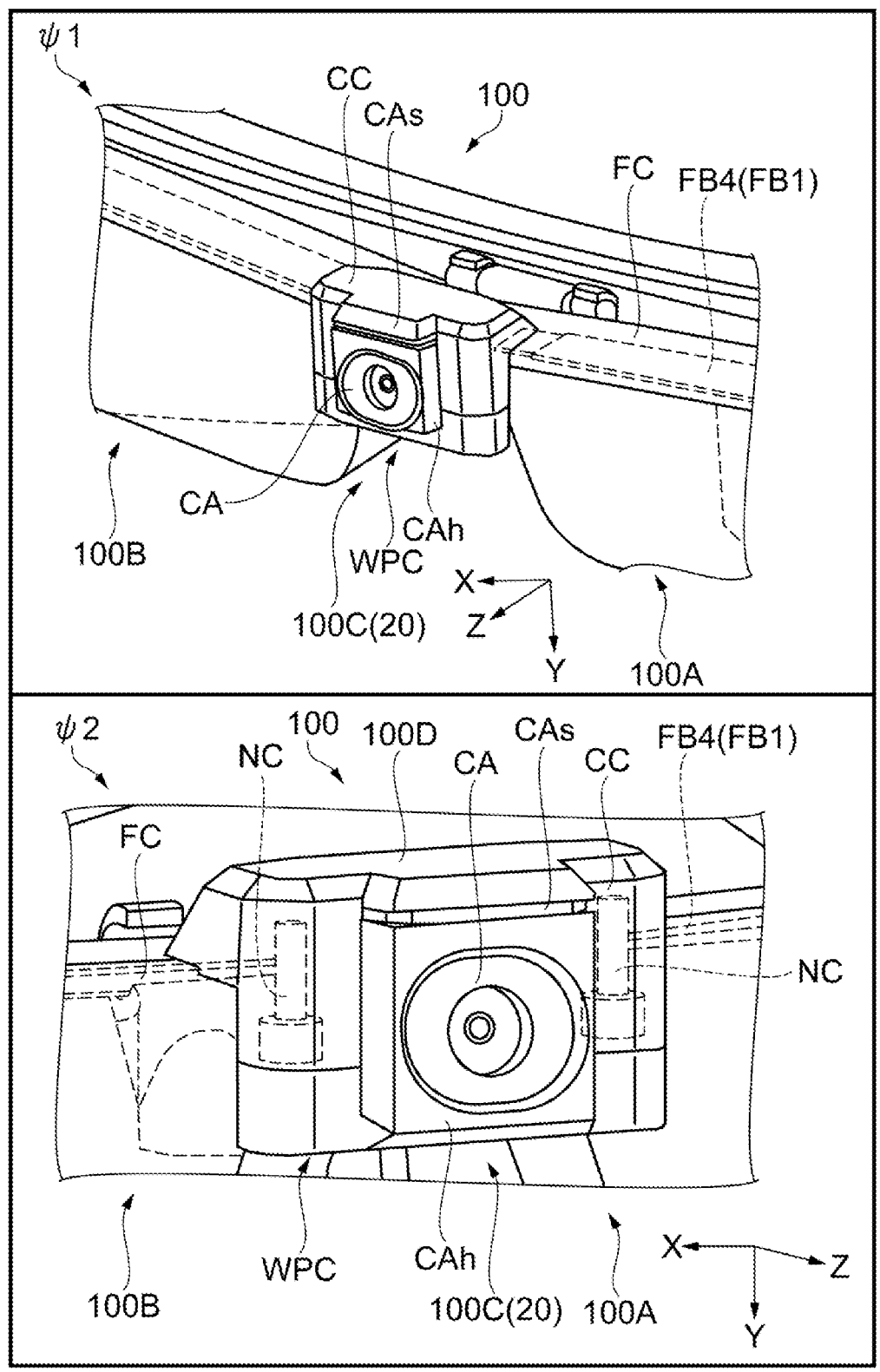
FIG. 3 is a partially enlarged perspective view illustrating an external appearance of an exemplary configuration of the wearable display device.

As illustrated in FIGS. 1 and 3, the camera CA is disposed at a center position, i.e., a position between the eyes of the viewer as with the nose pad NP and the fitting TP thereof. Thus, occurrence of deviation between the visual recognition direction of the viewer and the camera image can be reduced. Therefore, it is possible to increase the accuracy in an AR (augmented reality) function or the like, for example. If the camera CA is disposed in a side direction, such as the second image forming body part 105b side, for example, the accuracy in an AR function or the like may be impaired. Further, when used by a viewer with long hair, the hair may block the front side of the camera lens of the camera CA and the function may be reduced. In the present configuration, the camera CA is disposed at the center, and thus the above-described situation can be avoided or reduced.

As described above, in this embodiment, the illuminance sensor LS and the camera CA, which are external light sensors, are provided at positions corresponding to the front-of-eye part FP of the display device 100X, which is a part that is transparent while covering the front side of the eyes of the viewer wearing it. Thus, AR (augmented reality) provided with an image having higher positional accuracy can be achieved based on the illuminance and the external image acquired from the illuminance sensor LS and the camera CA.

Figure 7:
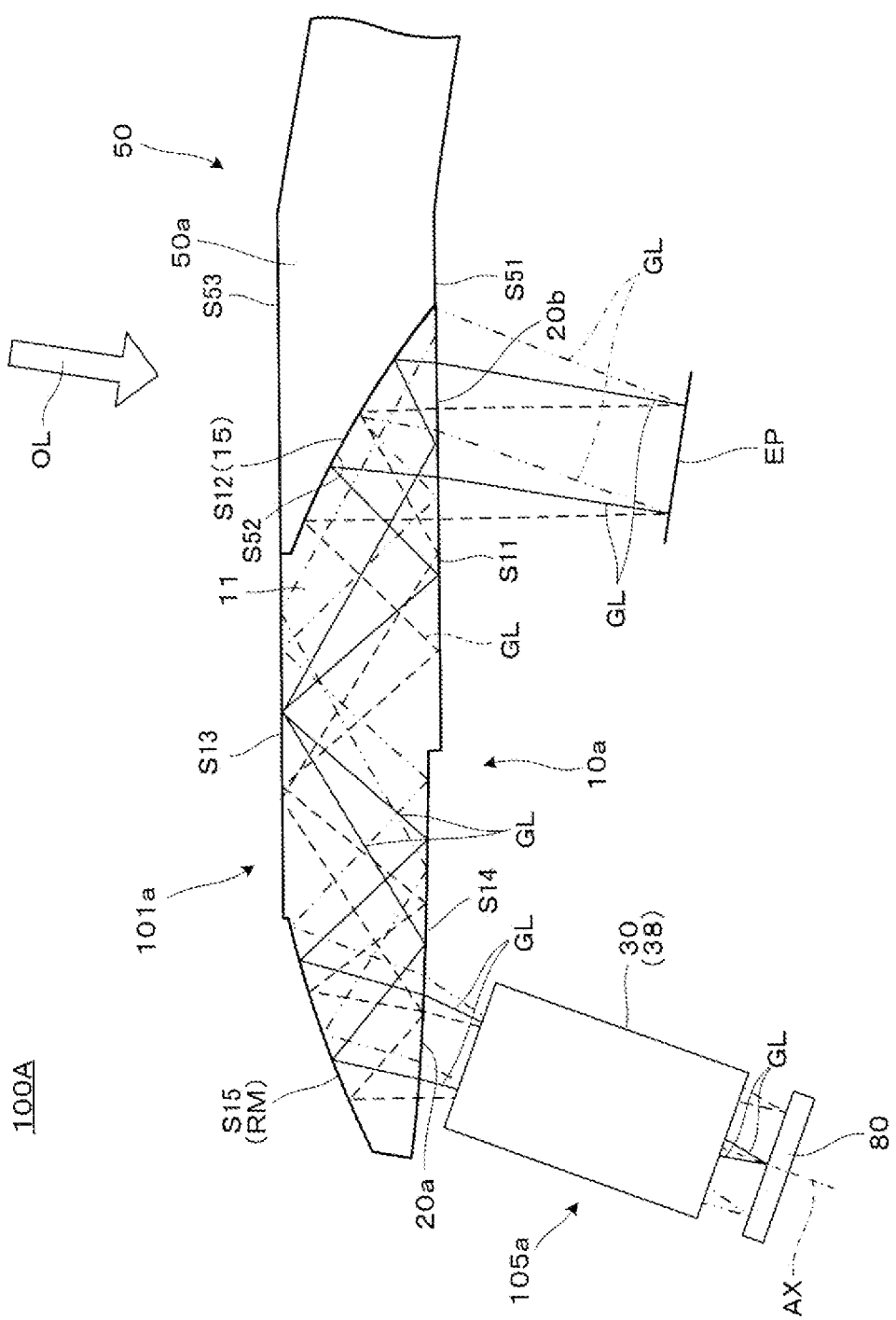
FIG. 7 is a schematic plan view illustrating light paths of image light.

An internal structure and the like of the wearable display device 100 will be briefly described below. First, as illustrated in FIG. 7, the first image forming body part 105a, i.e., the first display device 100A includes a display element 80, a lens barrel 38 and the like as optical systems for forming an image in the outer case 105d having a cover shape. Note that the display element 80 is composed of an organic EL display panel or an LCD panel, for example.

Figure 2:
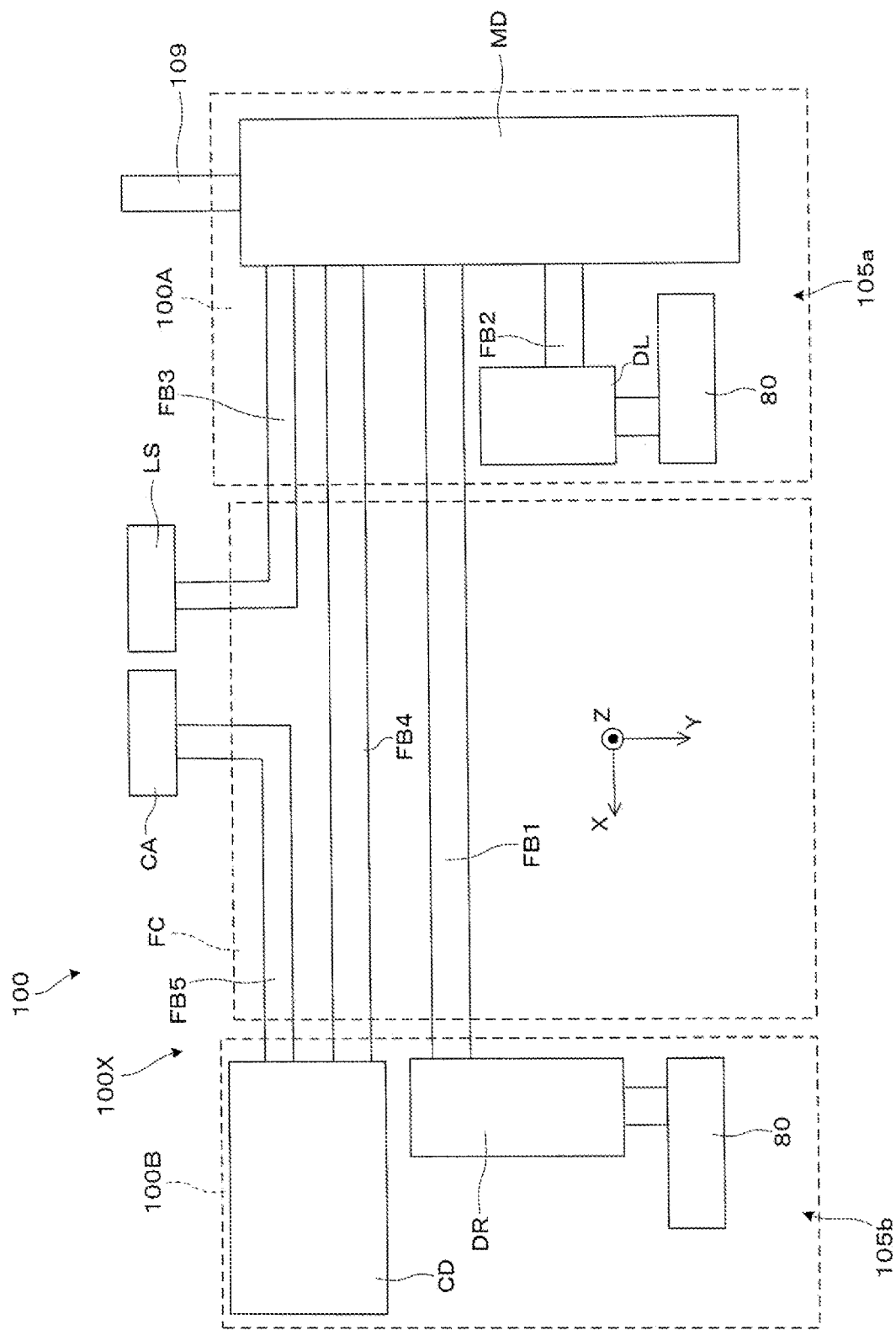
FIG. 2 is a schematic block diagram illustrating a circuit configuration of the wearable display device.

In addition, as illustrated in FIG. 2, the first image forming body part 105a includes, in addition to a main circuit board MD that centrally controls the operation of each part, a left-eye circuit board DL for driving the display element 80 and the like. Particularly in this embodiment, the main circuit board MD directly or indirectly controls the operation of the illuminance sensor LS and the camera CA as part of the operation control of the parts.

On the other hand, the second image forming body part 105b, i.e., the second display device 100B includes a right-eye circuit board DR for driving the display element 80 and the like in the outer case 105d. Particularly in this embodiment, a camera circuit board CD, which is a drive circuit board that drives the camera CA, is provided in the second image forming body part 105b, i.e., the second display device 100B.

Note that the outer case 105d of the first image forming body part 105a may be referred to as a first outer case 105d. Likewise, the outer case 105d of the second image forming body part 105b may be referred to as a second outer case 105d. In addition, the outer case 105d is composed of, for example, a magnesium alloy or the like.

For example, in the first image forming body part 105a, the display element 80 housed in the first outer case 105d is a display device that emits image light to form an image corresponding to a virtual image for the left eye. A projection lens 30 illustrated in FIG. 7 emits image light from the display element 80, and constitutes a part of the imaging system in the first virtual image forming optical part 101a. As a part of the projection lens 30, the lens barrel 38 holds an image forming optical element (not illustrated) that constitutes the projection lens 30.

Note that, also in the second image forming body part 105b, the display element 80 housed in the second outer case 105d and the projection lens 30 including the lens barrel 38 perform the same function so as to form an image corresponding to a virtual image for the right eye.

The main circuit board MD is a signal processing board that processes a signal including external information. Here, the external information is typically image data from the external device. The main circuit board MD has a function of an interface to the outside, and manages and controls the display operations of the left-eye circuit board DL and the right-eye circuit board DR. As such, as illustrated in FIG. 2, the main circuit board MD is coupled to each part through a cable.

The left-eye circuit board DL is a drive circuit board that drives the display element 80 in the first image forming body part 105a, and operates under the control of the main circuit board MD.

Likewise, the right-eye circuit board DR is a drive circuit board that drives the display element 80 in the second image forming body part 105b, and operates under the control of the main circuit board MD.

As describe above, the illuminance sensor LS operates under the control of the main circuit board MD so as to enable detection of the amount of light entering the eye of the viewer. In addition, as described above, the camera CA operates under control of the camera circuit board CD. Note that the camera circuit board CD operates under the control of the main circuit board MD to drive the camera CA. In other words, the main circuit board MD can directly or indirectly perform drive control of the illuminance sensor LS and the camera CA, and can perform image formation based on data about external conditions acquired from the illuminance sensor LS and the camera CA. In this embodiment, the illuminance sensor LS and the camera CA, which are external light sensors, are close to the position of the eyes of the viewer. Thus, information acquired from them, such as a line of sight and an amount of light entering the eye, properly reflects the viewer's external recognition status. Therefore, by using such information, it is possible to improve the positional accuracy, brightness, and the like in various image processes in the main circuit board MD or the external device coupled thereto.

Note that the various circuit boards such as the main circuit board MD have a structure in which a wiring line is formed on the surface of the insulating resin board and/or inside the insulating resin board, and an IC and/or an electronic element is mounted in the surface.

As illustrated in FIG. 2, each circuit board such as the camera circuit board CD is coupled to the main circuit board MD or other circuit board so as to achieve the above-described operation in each part. In this embodiment, as described above, flexible boards are employed in various parts as cables for coupling to each part, and particularly in this embodiment, flexible boards are employed as cables between the above-described external light sensor and each circuit board. Specifically, first, as a first flexible board that couples the main circuit board MD and the right-eye circuit board DR, a right-eye flexible board FB1 extends from the first display device 100A to the second display device 100B. In other words, the right-eye flexible board FB1 extends along the flat surface FS, which is the top surface extending flush from the first display device 100A to the second display device 100B. In addition, a left-eye flexible board FB2 is provided as a second flexible board that couples the main circuit board MD and the left-eye circuit board DL. Further, an illuminance sensor flexible board FB3 that couples the main circuit board MD and the illuminance sensor LS is provided. Note that in this embodiment, for example, the illuminance sensor flexible board FB3 is also the second flexible board. Specifically, in the following description, a flexible board (right-eye flexible board FB1) that extends from the first display device 100A to the second display device 100B and transmits a signal is the first flexible board, and a flexible board other than the first flexible board (the left-eye flexible board FB2 and the illuminance sensor flexible board FB3) that is disposed on the first flexible board in an overlapping manner is the second flexible board. Note that, in the following description, the above-described flexible boards may be simply referred; for example, the right-eye flexible board FB1 may be referred to simply as a flexible board FB1 or the like.

Further, in association with the employment of the camera circuit board CD and the camera CA, a camera-controlling flexible board FB4 that couples the main circuit board MD and the camera circuit board CD, and a camera-driving flexible board FB5 that couples the camera circuit board CD and the camera CA are provided. Note that they are also provided as the second flexible board, and may simply be referred to as a flexible board FB4 or the like.

In this embodiment, the plurality of flexible boards FB1 to FB5 are disposed in a partially overlapping manner. Note that in the example schematically illustrated in FIG. 2, the flexible board FB2 is located lowermost (on the +Y side), the flexible board FB1 is disposed thereon in an overlapping manner, the flexible board FB4 is disposed thereon in an overlapping manner, and the flexible board FB3 and the flexible board FB5 are located uppermost (on the −Y side).

Note that the surfaces of the flexible boards FB1 to FB5 are electromagnetically shielded when covered with a shield part formed by appropriately performing shielding. More specifically, for example, each shield part is coupled via a through hole to a negative potential (GND wiring) of the flexible boards FB1 to FB5, and is thus coupled to the external device through the cable 109 so as to be ground. When shielded in the above-described manner, the signal lines and the like in the flexible board can avoid influences of noise from the outside of the flexible board.

Of the flexible boards FB1 to FB5, the right-eye flexible board FB1, which is the first flexible board, and the left-eye flexible board FB2, which is the second flexible board, operate for transmitting image data. As such, the right-eye flexible board FB1 and the left-eye flexible board FB2 include a high-speed signal line so as to enable data transmission of high-quality video images, for example. Here, in the case where a high-speed signal line is employed as described above, it is particularly important to take countermeasures against noise received from the outside. In view of this, in this embodiment, a shielded state is provided as necessary as described above.

While it is conceivable that the illuminance sensor flexible board FB3 also includes a high-speed signal line, it is not necessarily required to employ the high-speed signal line, and therefore the illuminance sensor flexible board FB3 does not include the high-speed signal line here.

As described above, the right-eye flexible board FB1 extends from the first display device 100A to the second display device 100B, and transmits various signals and the like to the second display device 100B. Specifically, image data for the right eye is output from the main circuit board MD to the right-eye circuit board DR through the right-eye flexible board FB1. In addition, the right-eye flexible board FB1 functions also as a power supply cable for driving parts of the second display device 100B.

The left-eye flexible board FB2 transmits various signals and the like to the first display device 100A. Specifically, image data for the left eye is output from the main circuit board MD to the left-eye circuit board DL through the left-eye flexible board FB2. In addition, the left-eye flexible board FB2 functions also as a power supply cable for driving parts of the first display device 100A.

Note that the camera-controlling flexible board FB4 and the camera-driving flexible board FB5 also function as a power supply cable for driving the camera CA and the camera circuit board CD as well as a transmission cable for image data. Note that the flexible boards FB4 and FB5 also include a high-speed signal line.

As described above, in this embodiment, a plurality of flexible boards including a high-speed signal line are used as cables, and further the boards are provided in an overlapping manner, and thus, a wiring line having a thin and space-saving configuration can be achieved while achieving transmission of a large amount of data.

Figure 4:
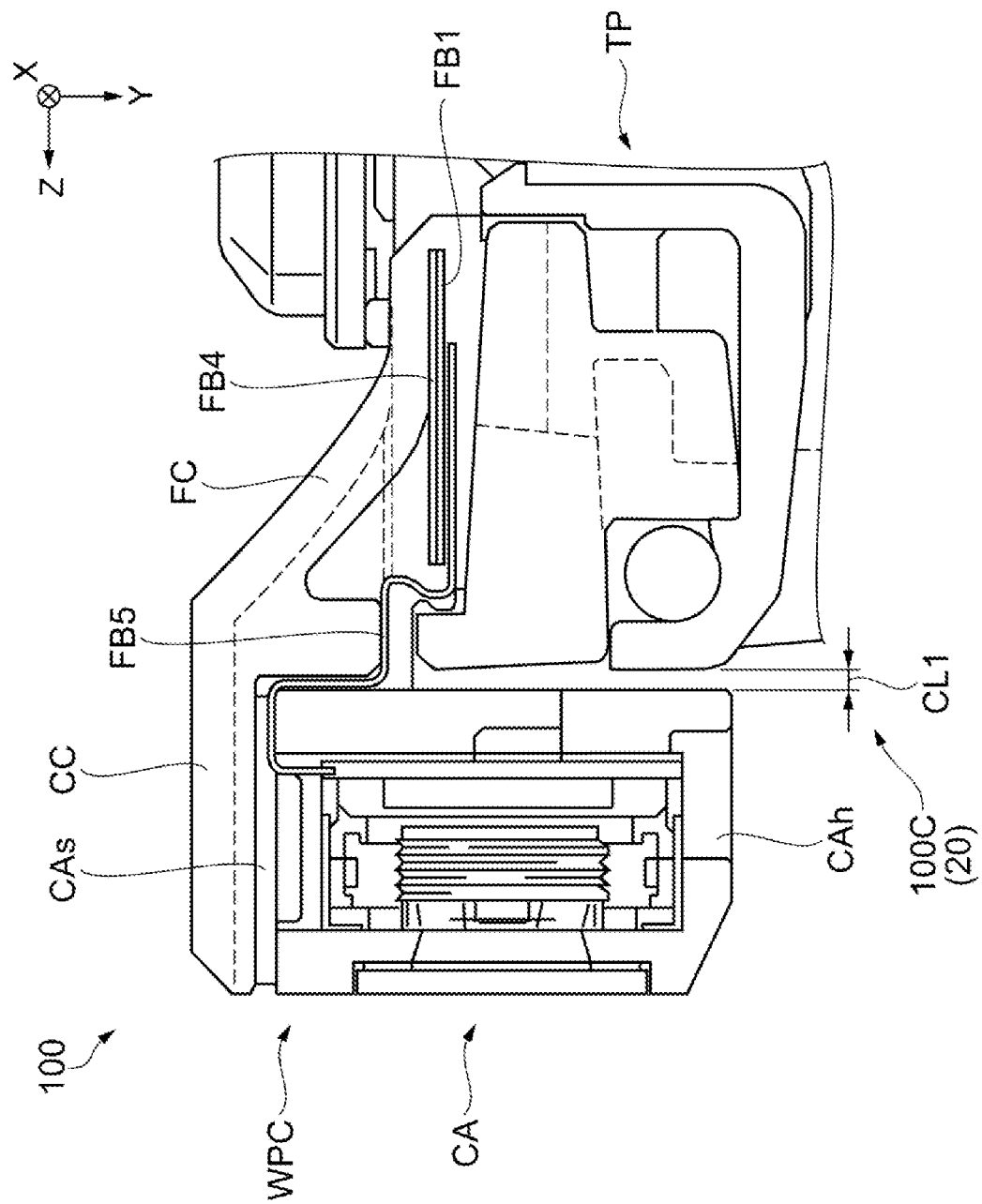
FIG. 4 is a side cross-sectional view for describing an internal structure of a camera serving as an external light sensor.

Exemplary arrangement and assembly of the camera CA will be described below with reference to FIGS. 3 and 4. FIG. 3 is a perspective view for describing an exemplary camera CA provided in the wearable display device 100, and FIG. 4 is a side cross-sectional view for describing an internal structure of the camera CA illustrated in FIG. 3. Note that, in FIG. 3, a state ψ1 illustrated in the upper section and a state ψ2 illustrated in the lower section are partially enlarged perspective views of the camera CA illustrated in FIG. 1 as viewed from different angles (views), and FIG. 4 is a cross-sectional view taken along the line CC in FIG. 1.

As described above, the camera CA is an external light sensor for capturing (taking) an external image corresponding to a line of sight of the viewer, and is extended from the cover member FC located at a center position between the first display device 100A and the second display device 100B constituting the wearable display device 100 as illustrated in the drawing. Specifically, the camera CA is provided at a location where the central member 50, which is a bridge part that joins the first display device 100A with the second display device 100B. Thus, the camera CA can more accurately take an external image suitable for the line of sight of the viewer in comparison with the case where the camera CA is disposed on a side (lateral side) of the wearable display device 100. Further, as illustrated in the drawing and as described above, the camera CA is structured to be attached to the camera cover member CC.

The camera CA is housed in a camera holder CAh having a housing shape so as to maintain an air-tight or fluid-tight state. Further, the camera CA is sealed within the camera holder CAh by screw-fixing the camera holder CAh to the camera cover member CC with a screwing part NC in a state where a sealing sheet member CAs is sandwiched between the camera holder CAh and the camera cover member CC. In the above-described manner, the camera CA is housed in a waterproof structure WPC composed of parts including a member provided by extending the cover member FC. Note that the camera CA and the flexible board FB5 are attached to the cover member FC, and in turn, the camera cover member CC while maintaining a state with the clearance (gap) CL1 from the surface of the light-guiding device 20 in the Z direction.

In addition, in the above-described case, the camera CA, which is an external light sensor, is attached to the flexible board FB5 that extends along the cover member FC and transmits signals, and is suspended by the flexible board FB5. Thus, the camera CA can be reliably attached to a desired position without affecting other members.

Figure 5:
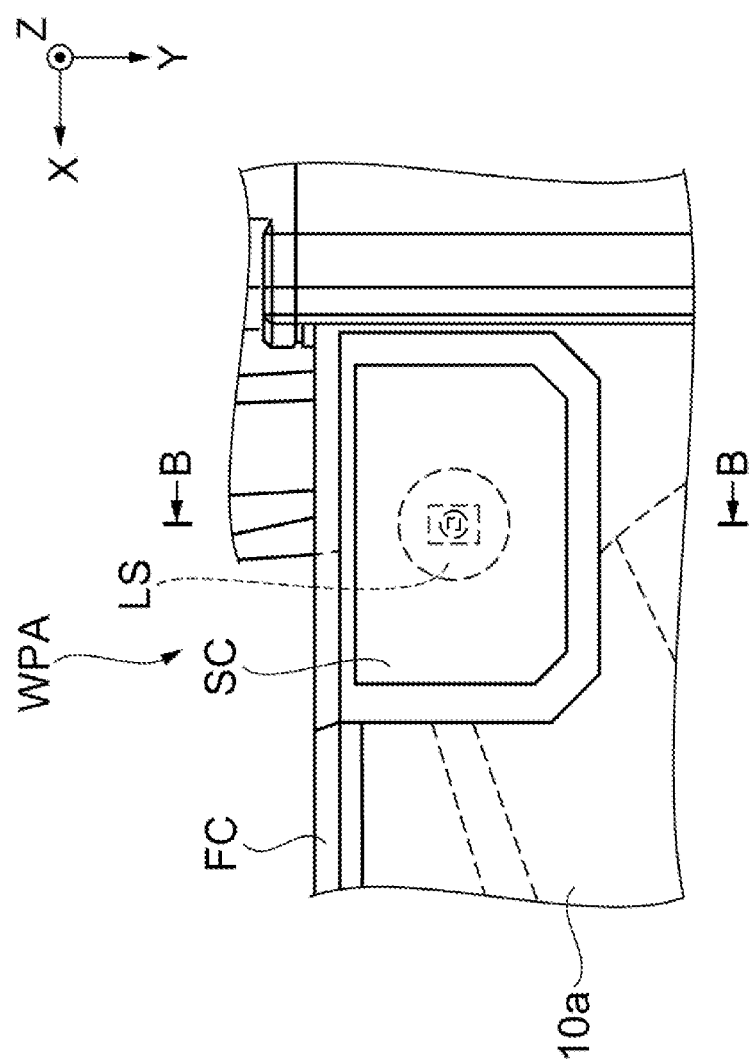
FIG. 5 is a partially enlarged front view of the wearable display device for describing an exemplary illuminance sensor serving as an external light sensor.
Figure 6:
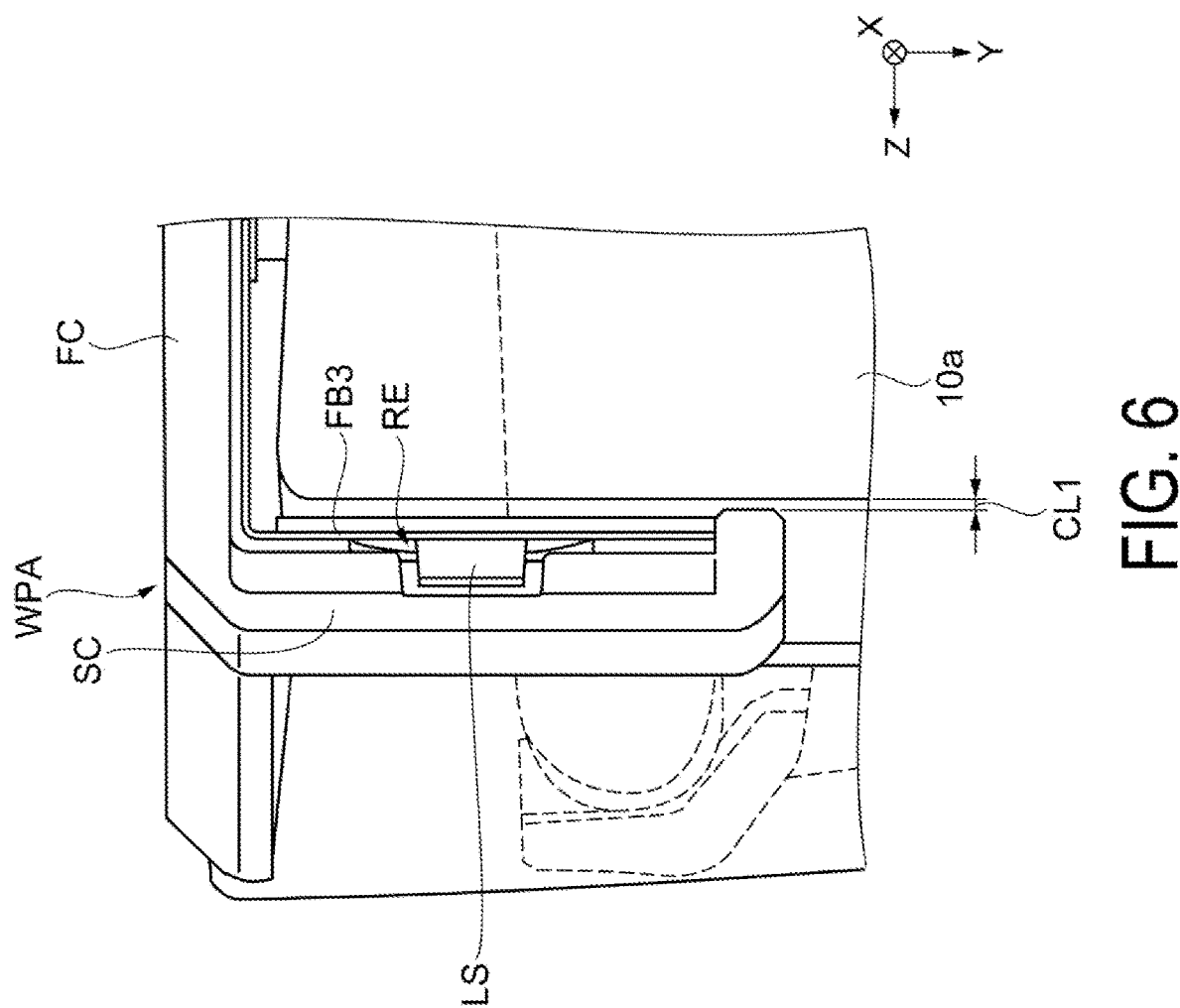
FIG. 6 is an enlarged side cross-sectional view of a portion including the illuminance sensor in the wearable display device.

Exemplary arrangement and assembly of the illuminance sensor LS will be described below with reference to FIG. 5 and the like. FIG. 5 is a partially enlarged view of FIG. 1, and is a front view for describing an exemplary illuminance sensor LS provided in the wearable display device 100. FIG. 6 is a cross-sectional view taken along the line BB of FIG. 5, and is an enlarged side cross-sectional view of a portion including the illuminance sensor LS in the wearable display device 100.

As described above, the illuminance sensor LS is an external light sensor that measures the ambient light intensity, and is provided in the first display device 100A in the wearable display device 100 including the first display device 100A and the second display device 100B as illustrated in FIG. 1. More specifically, the illuminance sensor LS is provided in a corner region where it less impairs the visibility of the viewer on the front surface side, i.e., the +Z side in the surface of the light-guiding member 10a of the first display device 100A that is opposite to the eye of the viewer. In other words, the illuminance sensor LS is disposed on the side of the front surface of the surfaces of the light-guiding member 10a such that the position of the eye of the viewer wearing it, the light-guiding member 10a, and the illuminance sensor LS are located in this order in the +Z direction, and the illuminance sensor LS is located at a position spaced apart from the emission region of the image light on the side of the light source of the image light in the light-guiding member 10a. Further, it is located at a position that is farther than the light-guiding member 10a constituting the first display device 100A with respect to the position of the eye of the viewer wearing it, and does not block the visibility. Further regarding the arrangement of the illuminance sensor LS with respect to the light-guiding surface of the light-guiding member 10a, i.e., the arrangement in the XY plane in the above description, the illuminance sensor LS is disposed at a position overlapping the light-guiding member 10a at a position in the proximity of the boundary between a portion housed in the outer case 105d (see FIG. 1) and a portion exposed from the outer case 105d in the light-guiding member 10a. In other words, it is located on the light source side near the outer case 105d in a transmission region of external light in the light-guiding member 10a, and is spaced away from the emission region of the image light in the light-guiding member 10a. In the illustrated example, the illuminance sensor LS is located on the left side (the −X side) and the upper side (the −Y side) as viewed from the viewer. This region may be located on the optical path in propagation of image light as described later with reference to FIG. 7. As such, in this embodiment, the illuminance sensor LS and the flexible board FB3 coupled thereto are maintained in a state where they are spaced apart from the surface of the light-guiding member 10a as illustrated in FIG. 6 so as not to inhibit the propagation of image light.

Specifically, as described above and as illustrated in FIGS. 5 and 6, the illuminance sensor LS is structured to be attached to an illuminance sensor cover member SC extending from the cover member FC. Further, as illustrated in FIG. 6, the illuminance sensor LS is embedded in a recess RE provided in the illuminance sensor cover member SC. In addition, the flexible board FB3 that is coupled to the illuminance sensor LS is bonded and fixed to a planar portion around the recess RE in the cover member FC, for example. In the above-described manner, the illuminance sensor LS and the flexible board FB3 are attached to the illuminance sensor cover member SC, and in turn, the cover member FC while maintaining a state with the clearance (gap) CL1 from the surface of the light-guiding member 10a in the Z direction. As described above, in the wearable display device 100 of this embodiment, the gap (clearance) CL1 is provided between the illuminance sensor LS, which is an external light sensor, and the front-of-eye part FP of the display device 100X. Thus, the illuminance sensor LS does not affect the light guidance of the image light even when the illuminance sensor LS is provided in the front-of-eye part FP where the light guidance of the image light is performed.

As described above, in the case where the illuminance sensor LS and the camera CA are disposed in the proximity of the light-guiding device 20 including the light-guiding member 10a, if the illuminance sensor LS, the camera CA, and/or a component thereof makes contact with the light-guiding member 10a, light guidance of image light through total internal reflection at the light-guiding member 10a is blocked, or in other words, the image quality is reduced. On the other hand, particularly in the case where see-through viewing is achieved using the light-guiding member 10a, it is necessary to dispose the illuminance sensor LS and the camera CA in the same surface as the light-guiding surface of the image light in order to properly detect the external light and the external scene. In consideration of the above-mentioned circumstances, in this embodiment, the illuminance sensor LS and the camera CA are disposed along the light-guiding surface of the light-guiding device 20 while maintaining the clearance (gap) CL1 from the light-guiding device 20 as described above.

In addition, in the above-described case, the illuminance sensor LS is housed in a waterproof structure WPA composed of parts including a member provided by extending the cover member FC.

Note that by disposing the illuminance sensor LS at a position further than the light-guiding member 10a with respect to the position of the eye of the viewer as described above, the space is more easily ensured when the viewer requires wearing of the glasses, for example. In addition, with the illuminance sensor LS located at a position spaced apart from the emission region of the image light on the side of the light source of the image light in the transmission region of the external light in the first display device 100A, i.e., the display device 100X as described above, a situation where the visibility of the viewer is affected by the illuminance sensor LS can be reduced or avoided.

In addition, in the above-described case, the illuminance sensor LS, which is an external light sensor, is attached to the flexible board FB3 that extends along the cover member FC and transmits a signal, and the illuminance sensor LS is suspended by the flexible board FB3. Thus, the illuminance sensor LS can be reliably attached to a desired position without affecting other members.

Image display, i.e., virtual image formation in the wearable display device 100 will be described below. FIG. 7 is a diagram illustrating a portion of the first display device 100A for particularly describing an optical structure of the first virtual image forming optical part 101a. As described with reference to FIG. 1 and the like, the wearable display device 100 is composed of the first display device 100A and the second display device 100B. However, since the first display device 100A and the second display device 100B have a symmetrical structure in the left-right direction, only the first display device 100A will be described, and the description of the second display device 100B will be omitted.

An overview of optical paths of image light GL will be described below with reference to FIG. 7. The light-guiding member 10a guides the image light GL from the projection lens 30 toward the eye of the viewer through reflection at first to fifth surfaces S11 to S15, and the like. Specifically, the image light GL from the projection lens 30 is first impinges on the fourth surface S14 and reflected by the fifth surface S15, which is an inner surface of a reflection film RM. Then, the image light GL again internally impinges on the fourth surface S14 so as to be totally reflected, then impinges on the third surface S13 so as to be totally reflected, and then, impinges on the first surface S11 so as to be totally reflected. The image light GL totally reflected by the first surface S11 impinges on the second surface S12 so as to partially pass through a half mirror 15 provided at the second surface S12 while being partially reflected. Then the image light GL again impinges on and passes through the first surface S11. The image light GL that has passed through the first surface S11 enters an exit pupil EP where the eye of the viewer is present as a substantially parallel luminous flux. In other words, the viewer views an image formed by the image light as a virtual image.

Next, the light transmission part 50a will be described prior to the description of the matter related to external images. As described above, the light transmission part 50a is a member integrally fixed with the light-guiding member, and assists the visually transparent function of the light-guiding member 10a. The light transmission part 50a includes a first transmission surface S51, a second transmission surface S52, and a third transmission surface S53 as surfaces having an optical function. The second transmission surface S52 is disposed between the first transmission surface S51 and the third transmission surface S53. The first transmission surface S51 is on an extended surface of the first surface S11 of the light-guiding member, the second transmission surface S52 is a curved surface that is integrally joined to the second surface S12, and the third transmission surface S53 is on an extended surface of the third surface S13 of the light-guiding member.

The first virtual image forming optical part 101a allows the viewer to visually recognize image light with the light-guiding member 10a, and allows the viewer to view a less distorted external image in the state where the light-guiding member 10a and the light transmission part 50a are combined. At this time, since the third surface S13 and the first surface S11 are flat surfaces that are substantially parallel to each other (visibility: approximately 0), almost no aberration or the like of extraneous light (external light) OL is caused. Further, the third transmission surface S53 and the first transmission surface S51 are flat surfaces that are substantially parallel to each other. Further, since the third transmission surface S53 and the first surface S11 are flat surfaces that are substantially parallel to each other, almost no aberration or the like is caused. Thus, the viewer views an external image with no distortion through the light transmission part 50*a*.

Figure 8:
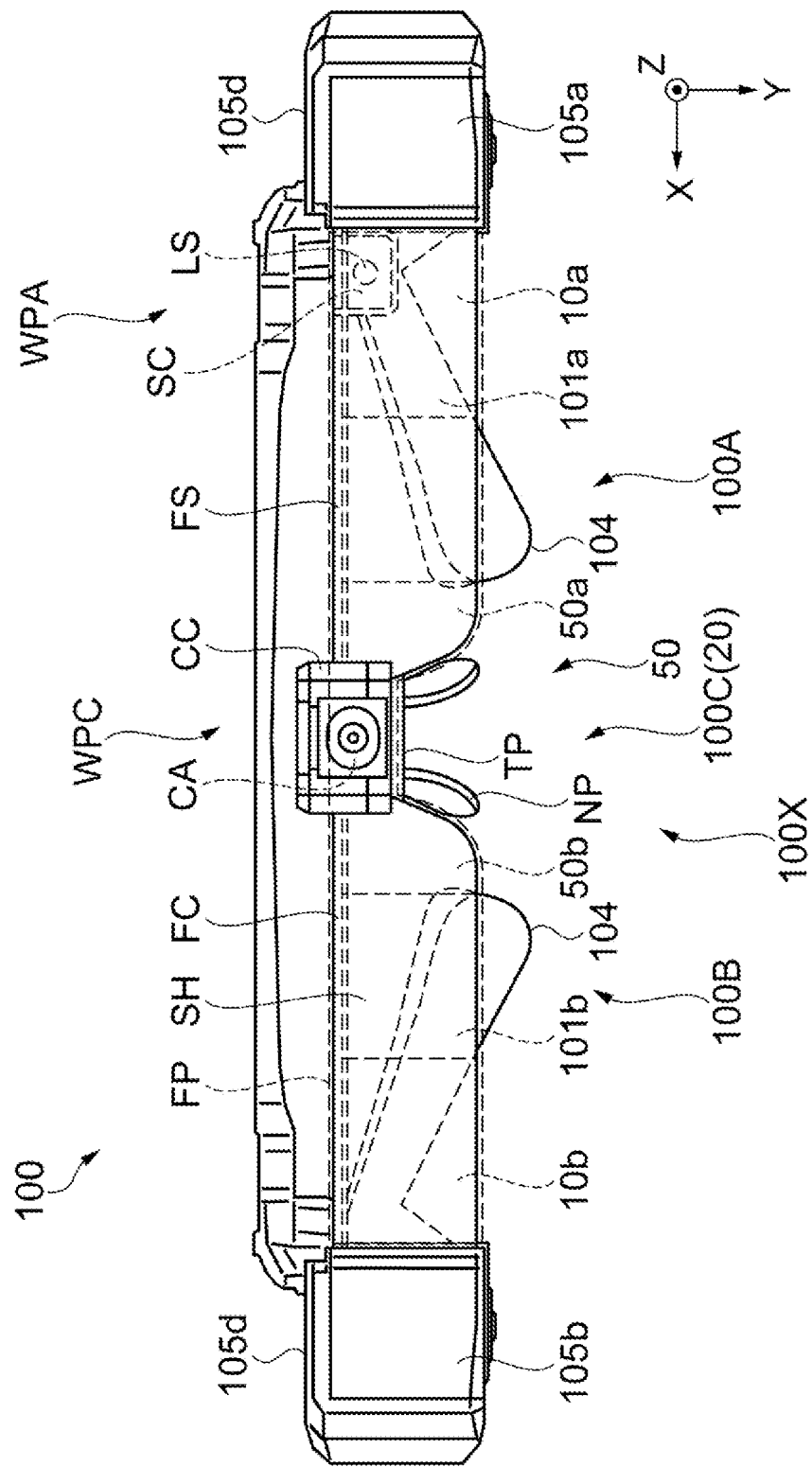
FIG. 8 is a front view for describing an exemplary wearable display device to which a light-controlling shade is attached.

The attaching of a light-controlling shade SH in the wearable display device 100 will be described below with reference to FIG. 8. FIG. 8 is a front view for describing an exemplary wearable display device 100 in which the light-controlling shade SH is attached. From a different standpoint, FIG. 1 illustrates a state where the light-controlling shade SH is removed, and FIG. 8 illustrates the wearable display device 100 in which the light-controlling shade SH is attached in the state illustrated in FIG. 1. In other words, the light-controlling shade SH is removable from the wearable display device 100. Note that, as illustrated in FIG. 8, the light-controlling shade SH can be mounted at a position on the side (+Z side) farther from the eye position of the viewer wearing it in the visually transparent light-guiding unit 100C, which is the front-of-eye part FP of the display device 100X. The light-controlling shade SH is a member that controls the external light that has passed through the visually transparent light-guiding unit 100C, and it is possible to apply various configurations such as a configuration made of resin, and a configuration that is electronically driven to adjust the light shielding rate, for example.

In addition, in this embodiment, the light-controlling shade SH covers the front-of-eye part FP of the display device 100X, and therefore the illuminance sensor LS, which is an external light sensor, is located at a position where the illuminance sensor LS receives the external light that has passed through the light-controlling shade SH when the light-controlling shade SH is mounted. That is, the illuminance sensor LS has a configuration in which the amount of received external light varies depending on the presence or absence of the light-controlling shade SH. In other words, the illuminance sensor LS performs light reception in accordance with the presence or absence of the light-controlling shade SH.

Figure 9:
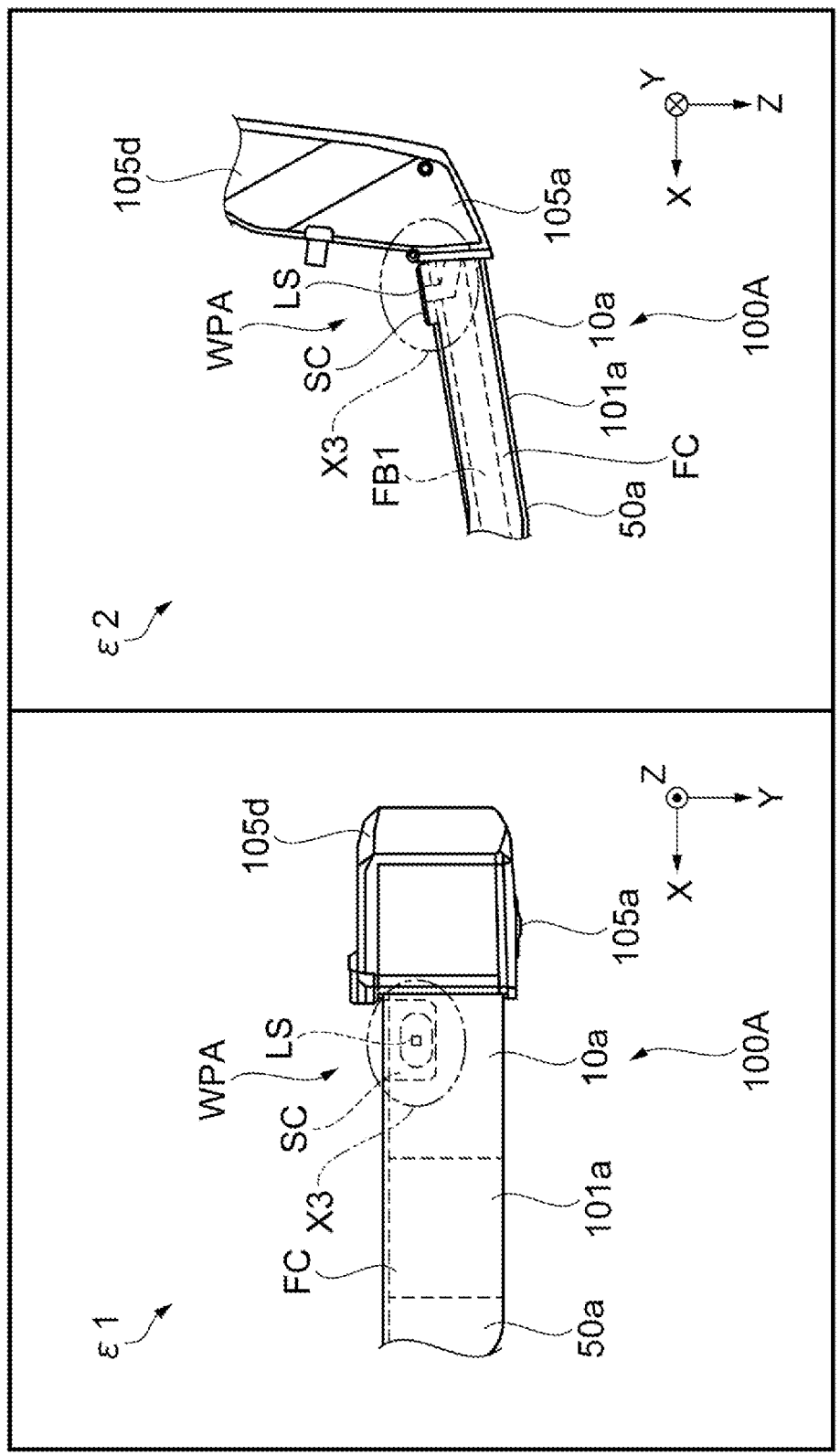
FIG. 9 is a view for describing a modification of the illuminance sensor.
Figure 10:
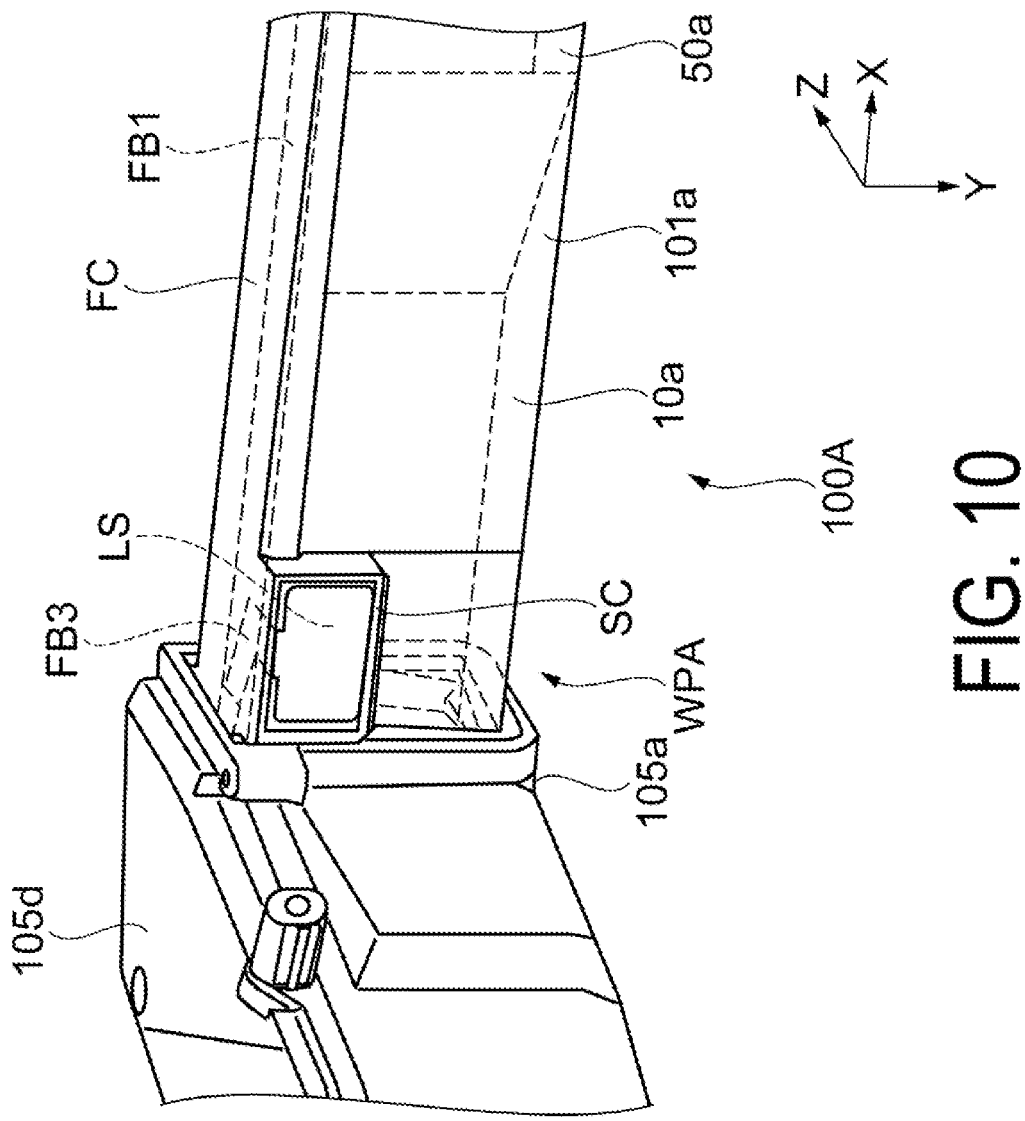
FIG. 10 is a partially enlarged perspective view of the illuminance sensor of FIG. 9 in the wearable display device.

A modification of the arrangement and assembly of the illuminance sensor LS will be described below with reference to FIGS. 9 and 10. In FIG. 9, a state ε1 is a front view illustrating a portion where the illuminance sensor LS is provided in the wearable display device 100, and a state ε2 is a plan view. In addition, FIG. 10 is a perspective view of the illuminance sensor LS of FIG. 9 as viewed from a different perspective or angle.

In the illustrated modification, unlike the above-described example, the illuminance sensor LS is provided in a corner region where it less impairs the visibility of the viewer on the rear surface side, i.e., the −Z side in the surface of the light-guiding member 10*a* of the first display device 100A that is opposite to the eye of the viewer. That is, the illuminance sensor LS is disposed on the side of the rear surface of the surfaces of the light-guiding member 10*a* such that the position of the eye of the viewer wearing it, the illuminance sensor LS, and the light-guiding member 10*a* are located in this order in the +Z direction, and the illuminance sensor LS is located at a position spaced apart from the emission region of the image light on the side of the light source of the image light in the light-guiding member 10*a*. In other words, the illuminance sensor LS is located between the position of the eye of the viewer wearing it and the light-guiding member 10*a*. That is, the illuminance sensor LS is located at a position that is closer than the light-guiding member 10*a* constituting the first display device 100A, and does not block the visibility. In the illustrated example, the illuminance sensor LS is located on the left side (the −X side) and the upper side (the −Y side) as viewed from the viewer. This region may also be located on the optical path in propagation of the image light GL illustrated with reference to FIG. 7. As such, also in this case, the illuminance sensor LS and the flexible board FB3 are structured to maintain a state with a clearance (gap) from the surface of the light-guiding member 10*a* as in the above-described exemplary case.

Note that, by disposing the illuminance sensor LS at a position closer than the light-guiding member 10*a* with respect to the position of the eye of the viewer as described above, it is possible to suppress the increase of the size of the device by reducing outward (+Z side) projection of the illuminance sensor LS.

As described above, the wearable display device 100 according to this embodiment includes a display device 100X configured to emit image light GL to display an image, and a camera CA or an illuminance sensor LS as an external light sensor configured to sense external light, and the illuminance sensor LS, for example, is located at a position overlapping a front-of-eye part FP of the display device that forms a visually transparent light-guiding unit 100C in an emission direction of the image light GL.

In the above-described case, the illuminance sensor LS and the camera CA, which are external light sensors, are provided at positions overlapping the front-of-eye part FP of the display device 100X in the emission direction of the image light GL from the display device 100X. Thus, the sensing direction of the external light in the illuminance sensor LS and the camera CA can be set in accordance with the direction of the line of sight of the viewer so as to reflect the visual recognition state of the viewer, and a state where they are located in the proximity of the position of the eye of the viewer can be maintained. Therefore, for example, the amount of external light entering the eye of the viewer, and/or the extraneous image or the like visually recognized by the viewer can be more accurately taken in comparison with the case where the camera CA is disposed on a side (lateral side) of the device.

Modifications and Other Matters

While the display element 80 is an organic EL display panel or an LCD panel in the above-described embodiments, the display element 80 may be a self-luminous display element represented by an LED array, a laser array, a quantum dot light emitting element, or the like. Further, the display element 80 may be a display using a laser scanner including a combination of a laser light source and a scanner. Note that a liquid crystal on silicon (LCOS) technique may be used in place of an LCD panel.

In addition, the main circuit board MD, the left-eye circuit board DL, the right-eye circuit board DR, and the camera circuit board CD of FIG. 2 are composed of semiconductor elements such as operational elements and converting elements. Specifically, the main circuit board MD may be composed of a member including at least one circuit such as a digital signal processor (DSP), an application specific integrated circuit (ASIC), a programmable logic device (PLD), a field programmable gate array (FPGA), a graphics processing unit (GPU), and a central processing unit (CPU).

In addition, the outer case 105*d* is not limited to a magnesium alloy, and may be formed from aluminum or an aluminum alloy.

In addition, various cameras such as a camera for taking infrared light or the like and a camera for sensing temperature, as well as a camera for capturing a normal image, may be applied as the camera CA in accordance with the purpose. Further, in accordance with the purpose, the camera CA and the camera circuit board CD may be replaceable.

While the wearable display device 100 is described as a see-through head-mounted display (HMD) in the above description, the wearable display device 100 may be a device that cannot enable see-through viewing of an external image, and may be an optical system for viewing only a virtual image by blocking an external image.

As described above, a wearable display device in one aspect includes a display device configured to emit image light to display an image, and an external light sensor configured to sense external light. The external light sensor is located at a position where the external light sensor overlaps a font-of-eye part of the display device in an emission direction of the image light.

In the above-described wearable display device, the external light sensor is located at a position overlapping the front-of-eye part of the display device in the emission direction of the image light. Thus, the sensing direction of the external light in the external light sensor can be set in accordance with the line of sight of the viewer and a state where it is located in the proximity of the position of the eye of the viewer can be maintained. Therefore, for example, the amount of external light entering the eye of the viewer, and/or the extraneous image or the like visually recognized by the viewer can be more accurately taken in comparison with the case where the external light sensor is disposed on a side (lateral side) of the device.

In a specific aspect, a gap is provided between the external light sensor and the front-of-eye part of the display device. In this case, with the gap, the external light sensor does not affect the light guidance of the image light by the display device even when the external light sensor is provided at the front-of-eye part where the light guidance of the image light is performed.

In another aspect, the front-of-eye part of the display device is a part that is transparent while covering a front-of an eye of a viewer wearing the wearable display device. In this case, AR (augmented reality) provided with an image having higher positional accuracy can be achieved based on the external light sensor while achieving see-through viewing, for example.

In yet another aspect, the external light sensor is located at a position spaced apart toward a light source side of the image light from an emission region of the image light in a transmission region of the external light. In this case, a situation where the visibility of the viewer is affected by the external light sensor can be reduced or avoided.

In yet another aspect, a light-controlling shade that is removably attached at front-of-eye part of the display device is further provided. The light-controlling shade is configured to control the external light that passes therethrough. The external light sensor is located at a position where the external light sensor receives the external light passing through the light-controlling shade when the light-controlling shade is attached. In this case, a configuration in which the amount of external light received by the external light sensor varies depending on the presence or absence of the light-controlling shade while enabling control of the external light by the light-controlling shade can be achieved.

In yet another aspect, the front-of-eye part of the display device is constituted of a light-guiding member configured to guide the image light. In this case, in the display device, the external light can be sensed by the external light sensor while guiding the image light by the light-guiding member.

In yet another aspect, the external light sensor is located on a front surface side of surfaces constituting the light-guiding member. In this case, for example, a space for eyeglasses is easily ensured inside the device.

In yet another aspect, the external light sensor is located on a rear surface side of surfaces constituting the light-guiding member. In this case, increase of the size of the device can be suppressed.

In yet another aspect, the external light sensor is an illuminance sensor configured to measure ambient light intensity or an image-capturing camera configured to capture an external image. In this case, an image can be provided in accordance with the external environment.

In yet another aspect, the external light sensor is attached to a flexible board configured to transmit a signal, the external light sensor being suspended from the flexible board. In this case, a state where the external light sensor is reliably attached to a desired position without affecting other members can be achieved.

In yet another aspect, a cover member configured to house the flexible board is further provided, and the external light sensor is housed in a waterproof structure provided by extending the cover member. In this case, the external light sensor can be reliably protected.

In yet another aspect, the display device includes a first display device and a second display device configured to display images correspondingly to left and right eyes, and the external light sensor is provided at a bridge part configured to join the first display device with the second display device. In this case, the external light sensor can be more accurately taken in comparison with the case where the external light sensor is disposed on a side (lateral side) of the device.

What is claimed is:

1. A wearable display device comprising:
    a display device configured to emit image light to display an image;
    an external light sensor configured to sense external light; and
    an illuminance sensor cover member that covers a surface of the display device, wherein:
        the external light sensor is located at a position where the external light sensor overlaps a front-of-eye part of the display device in an emission direction of the image light,
        in a front-rear direction, a gap is provided between the external light sensor and the front-of-eye part of the display device,
        in the front-rear direction, the external light sensor is located between a transparent part of the display device and the illuminance sensor cover member,
        the front-of-eye part of the display device is a part that is transparent while covering a front of an eye of a viewer wearing the wearable display device, and
        the external light sensor is located at a position spaced apart toward a light source side of the image light from an emission region of the image light in a transmission region of the external light.

2. The wearable display device according to claim 1, wherein the front-of-eye part of the display device is constituted of a light-guiding member configured to guide the image light.

3. The wearable display device according to claim 2, wherein the external light sensor is located on a front surface side of surfaces constituting the light-guiding member.

4. The wearable display device according to claim 2, wherein the external light sensor is located on a rear surface side of surfaces constituting the light-guiding member.

5. The wearable display device according to claim 1, wherein the external light sensor is an illuminance sensor configured to measure ambient light intensity, or an image-capturing camera configured to capture an external image.

6. The wearable display device according to claim 1, wherein the external light sensor is attached to a flexible board configured to transmit a signal, the external light sensor being suspended from the flexible board.

7. The wearable display device according to claim 6, further comprising a cover member configured to house the flexible board, wherein
the external light sensor is housed in a waterproof structure provided by extending the cover member.

8. The wearable display device according to claim 1, wherein the illuminance sensor cover member covers a front surface of the display device.

9. The wearable display device according to claim 1, wherein the external light sensor is embedded in a recess provided in a rear surface of the illuminance sensor cover member.

10. The wearable display device according to claim 1, wherein the external light sensor is located closer to the outer edge of the display device than an inner edge of the display device.

11. A wearable display device comprising:
a display device configured to emit image light to display an image;
an external light sensor configured to sense external light;
an illuminance sensor cover member that covers a surface of the display device, wherein:
the external light sensor is located at a position where the external light sensor overlaps a front-of-eye part of the display device in an emission direction of the image light,
in a front-rear direction, a gap is provided between the external light sensor and the front-of-eye part of the display device,
in the front-rear direction, the external light sensor is located between a transparent part of the display device and the illuminance sensor cover member,
the front-of-eye part of the display device is a part that is transparent while covering a front of an eye of a viewer wearing the wearable display device; and
a light-controlling shade that is removably attached at the front-of-eye part of the display device, the light-controlling shade being configured to control the external light that passes therethrough, wherein
the external light sensor is located at a position where the external light sensor receives the external light passing through the light-controlling shade when the light-controlling shade is attached.

12. A wearable display device comprising:
a display device configured to emit image light to display an image;
an external light sensor configured to sense external light; and
an illuminance sensor cover member that covers a surface of the display device, wherein:
the external light sensor is located at a position where the external light sensor overlaps a front-of-eye part of the display device in an emission direction of the image light,
in a front-rear direction, a gap is provided between the external light sensor and the front-of-eye part of the display device,
in the front-rear direction, the external light sensor is located between a transparent part of the display device and the illuminance sensor cover member,
the display device includes a first display device and a second display device configured to display images correspondingly to left and right eyes, and
the external light sensor is provided at a bridge part configured to join the first display device with the second display device.

* * * * *